United States Patent [19]

Grünig

[11] Patent Number: 4,631,357

[45] Date of Patent: Dec. 23, 1986

[54] METHOD OF AND DEVICE FOR MONITORING A PLURALITY OF AUTOMATIC SELLING MACHINES

[75] Inventor: Dieter Grünig, Alpnach, Switzerland

[73] Assignee: Grünig Administration, Badger, Minn.

[21] Appl. No.: 651,699

[22] Filed: Sep. 14, 1984

[30] Foreign Application Priority Data

Sep. 14, 1983 [CH] Switzerland .......................... 5020/83

[51] Int. Cl.⁴ ........................ H04Q 9/00; H04M 11/00

[52] U.S. Cl. .................................. 379/40; 340/825.35; 379/44; 379/106

[58] Field of Search ........... 179/2 A, 6.3 MA, 2 AM; 221/2, 6, 21; 340/825.35

[56] References Cited

U.S. PATENT DOCUMENTS 4,369,442 1/1983 Werth et al. .................... 340/825.35
4,398,651 8/1983 Kumpfer ..................... 340/825.35 X

FOREIGN PATENT DOCUMENTS 2086114 5/1982 United Kingdom ........... 340/825.35

*Primary Examiner*—James L. Dwyer
*Attorney, Agent, or Firm*—Michael J. Striker

[57] ABSTRACT

A plurality of selling machines is provided with coding devices assigned to each machine and connected via a telephone network to a central switching station and via subscriber lines to individual subscriber stations. Each machine is provided with sensors of predetermined operational conditions and/or interferences in the machine, the sensors delivering an output signal which is connected to the coding device. In the coding device the signal is coded according to the particular operational condition and/or interference and combined with a primary recognition signal. The combined coded signal is transmitted to the switching station where the recognition signal is identified and the remaining signal is switched over and transmitted to the subscriber station. In the subscriber station, the signal is processed in a computer and the output message is displayed on a display board and recorded in a printer.

3 Claims, 1 Drawing Figure

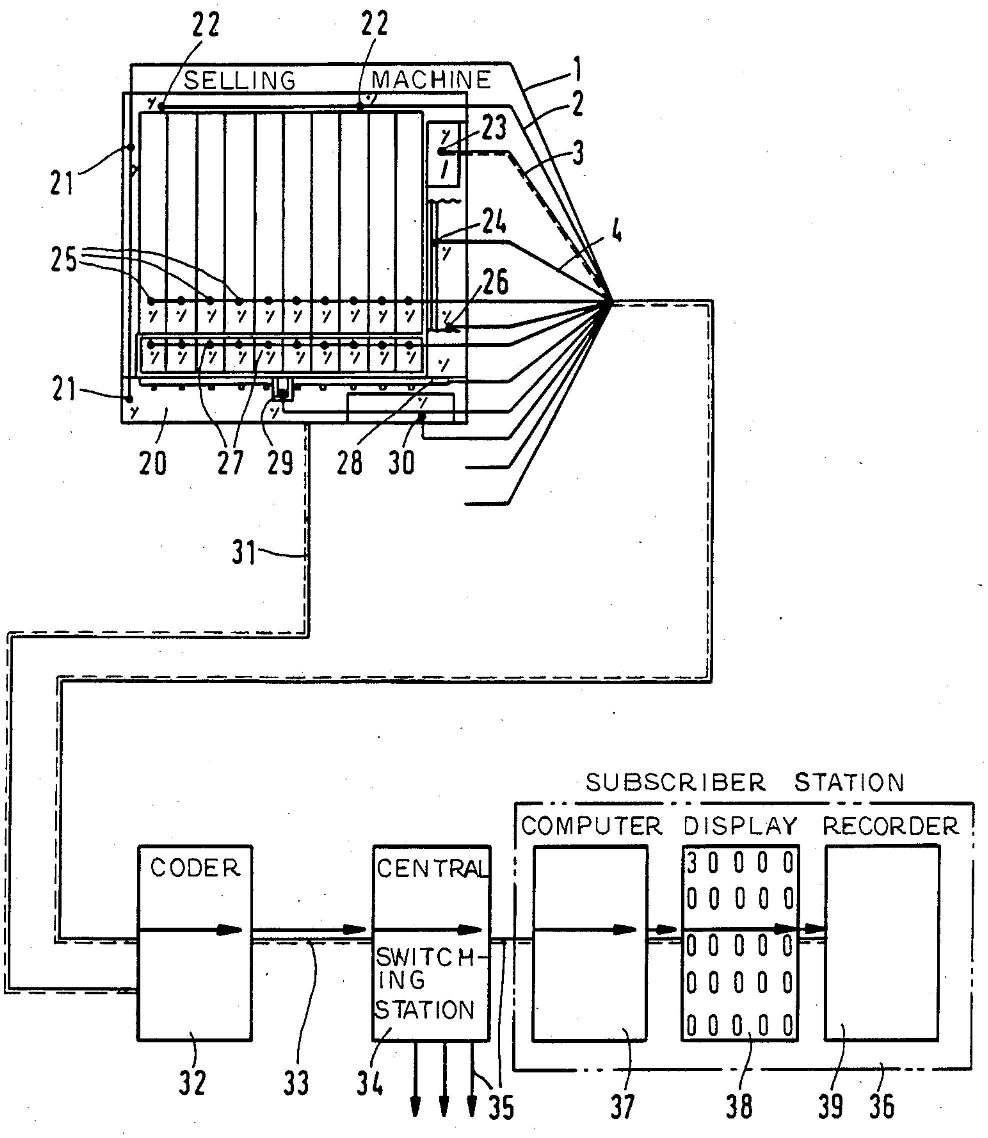
SELLING MACHINE
1
2
3
4
21
22
22
23
24
25
26
20
27
29
28
30
31
SUBSCRIBER STATION
CODER
CENTRAL
SWITCHING STATION
COMPUTER
DISPLAY
RECORDER
32
33
34
35
37
38
39
36

METHOD OF AND DEVICE FOR MONITORING A PLURALITY OF AUTOMATIC SELLING MACHINES

BACKGROUND OF THE INVENTION

The present invention relates to a method of monitoring a plurality of automatic delivery selling machines each provided with a transmitter releasable in response to a predetermined operational condition and/or interference in the machine.

Most of interferences in automatic selling machines result from burglary attempts and similar unauthorized manipulations. The latter interferences and also others caused by the malfunctions in the machine itself, result in a complete or partial inactivation of the selling machine. So far such interferences can be removed only after relatively long-time interval, namely when the manager of the machines has received a message about the malfunction from a customer or during an examination, for example, during the regular reloading of articles in the selling machines. Since during this relatively long time period between recognition of the malfunction and its removal the selling machine remains out of operation, a considerable operational loss will occur.

In order to render burglary attempts and similar unauthorized manipulations more difficult, the automatic selling machines are equipped with transmitters which, when released switch on an acoustic alarm for example. Nevertheless, the manager or police are notified about the alarm only in the case when other persons response to the alarm by a telephone call. When the selling machines are situated at out of the way locations or if the alarm is activated at night, no notification is frequently received.

A general practice is to store in the selling machine a relatively low supply of articles in order to prevent a too long stay of the articles in the machine and also to reduce the inventory of articles in stock. On the other hand, it is desirable that the selling machines be continuously supplied with a sufficient amount of the various articles, for example, of different sorts of cigarettes in order to avoid disappointment of users of the machines when an article, for example a desired brand of cigarettes is no longer available. In view of these considerations, a frequent checkup of all active selling machines for the purpose of their timely refilling is necessary. Evidently, the expenditures for maintaining the requisite personnel and organization are considerable.

SUMMARY OF THE INVENTION

It is therefore a general object of the present invention to overcome the aforementioned disadvantages.

More particularly, it is an object of the invention to provide an improved method of and device for monitoring a plurality of automatic delivery selling machines to enable a remote monitoring of each machine from a central machine so that the expenditures for removing interferences and for refilling the selling machines be reduced.

Another object of this invention is to provide such an improved method and arrangement which enables the concentration of persons and organizational measures to those selling machines only in which an interference or an unexpected need for refilling has occurred.

In keeping with these objects and with others which will become apparent hereafter, one feature of the invention resides, in a method in which signals delivered by individual transmitters in each machine are coded and provided with an identification signal assigned to each individual selling machine, the coded signal together with the identification are transmitted via telephone network to a switching central station where depending on the identification code, the coded signal is switched over to a particular subscriber station pertaining to the manager of the selling machine. At the subscriber station the signal is decoded and the message is displayed on a display device or recorded in a recorder.

The central switching station can handle all messages pertaining to different sets of selling machines and distribute the messages according to the identification codes to corresponding subscriber stations pertaining to the managers of respective sets where the particular message is displayed or recorded. The display or record indicates which particular selling machine has transmitted the signal and what kind of interference or operational condition has occurred. At the subscriber station the manager takes care of the maintenance and/or refilling operation or notifies police about burglary.

The automatic delivery selling machines especially the cigarette selling machines, are usually installed at widely dispersed locations, nevertheless, a separate communication network nor the provision of a wireless communication between the machine is not desirable because of high costs involved with the construction of such a network. Instead, for transmitting the messages from the individual machines a conventional telephone network which is usually present in the proximity of the location of the machine, can be used so that the hook-up expenditures between the transmitters in the machine and the network be relatively low.

In a further elaboration of this invention, some of the transmitters or sensors in the machine are immediately connected via a conductive path to the coding device while the remaining transmitters or sensors are connected to the coding device by means of at least two additional conductive paths; in the coding device, the signals incoming through the one or more conductive paths are converted in messages pertaining to respective transmitters or sensors, each message is combined with an identification signal pertaining to the corresponding selling machine, the combined signal is converted in another frequency and transmitted via the telephone network to a switching central station.

In this manner, the number of conductors between the selling machine and the coding device is greatly reduced. For example, twelve transmitters in a selling machine can be connected to the coding device by four conduits only. The transmitters preferably operate as simple on-off switches. The first four switches control directly the connection or disconnection of the four conductors while the remaining eight switches control the simultaneous connection or disconnection of two or three conduits.

The requisite power source for the transmitters in the selling machine and for the coding device is preferably the low voltage of the telephone network itself so that a separate power supply is not necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a simplified circuit diagram of a monitoring system for a plurality of automatic delivery selling machines according to this invention.

DESCRIPTION OF THE PREFERRED EMBODIMENT

A plurality of selling machines, for example an automatic delivery cigarette selling machine 20 is provided with sensors or transmitters in the form of switches 21 through 30 whose function will be explained below.

Two switches 21 are arranged for sensing a burglary attempt. When one of these two switches 21 is closed, a low voltage supplied via conduits 31 is applied to a conductor 1 in the machine. The mount of the machine to a wall is monitored by a switch 22 which is connected to conductor 2. In a coin tester is arranged a switch 23 connected to conductor 3 so that in the case of an interference in the coin tester, the low supply voltage is delivered to the conduit 3. A switch 24 is arranged in the coin stack chute and connects in the case of an interference in the coin stack a conductor 4 to the voltage supply.

A group of switches 25 is arranged in respective article compartments of the machine, and when actuated after the discharge of all article from a compartment, they apply the low voltage simultaneously to conduits 1 and 2 to monitor the load of a kind of the articles. A switch 26 monitors the overall operation of the machine and at an interference connects simultaneously the conductors 1 and 3. Switch 27 signals the complete discharge of an article compartment by switching on the combined conductors 1 and 4. The release is monitored by a switch 28 connecting conductors 2 and 3. A switch 29 controls the turnover and switches on simultaneously the conductors 2 and 4. Finally in the cash compartment of the machine there is arranged a switch 30 which upon interference or damage of the cash compartment lock applies voltage to conduits 3 and 4.

For additional sensors there is still the possibility to combine simultaneously three conductors, for example, conductors 1, 2 and 3 or 1, 3 and 4. The latter combinations represent a reserve for additional messages which may be desired during the machine operation.

Messages from the switches 21 through 30 reach via conductors 1 to 4 a coding device 32. The coding device is power supplied from the same source of low voltage and, as explained before, is connected to each selling machine 20 via four conductors 1 to 4 and a low voltage power supply conduit 31.

In the coding device 32 the signals delivered from respective switches 21 through 30 are coded with codes pertaining to these switches and combined with a recognition code which identifies the selling machine 20 from which a signal has been received and which also indicates the proprietor of the machine. The resulting composite message thus includes information about individual selling machines and an information about the occurring operational condition or disturbance. The composite message is also converted in the coding device 32 into an alternating signal of a different frequency and transmitted via a telephone network 33 to a switching central station 34. In the latter station the recognition signal is decoded and the message is switched over to a corresponding subscriber line 35 through which it is transmitted to the identified subscriber station 36.

In the subscriber station 36 the message is first fed into a computer 37 where it is decoded and processed so as to retrieve from a collection of data stored in the memory the details about the particular selling machine in question, particularly the location and the name of the machine, the address and the telephone number of the person on whose property the selling machine is installed. These identification data together with the data relating to the specific interference or operational condition are applied to a display device 38, for example to a display board and simultaneously are recorded by a recording device 39 such as for example a printer.

For example, if in the automatic selling machine 20 an interference is sensed in the coin tester, the switch 23 closes and applies the low voltage via conduit 3 to the coding device 32 where it is coded with an appropriate code and combined with a recognition code pertaining to the particular machine. For example, if the recognition code of a machine number 1 is 100 and the interference number 3 corresponding to the closing of the switch 23 has the code number 13, the composite coded message is "10013". This number is converted into a number and transmitted in two different frequencies to the switching central station 34. In the station 34, recognition number "100" is decoded and the remaining message is transmitted via the subscriber line 35 into the subscriber station 36. In the computer 37 the remaining message "13" addresses a store in which the list of all possible interferences or operational conditions is held. The read-out operational condition or interference, in this example the interference in the coin tester is displayed on a board 38 and recorded in a printer 39.

It will be understood that each of the elements described above, or two or more together, may also find a useful application in other types of constructions differing from the types described above.

While the invention has been illustrated and described as embodied in a specific example of the monitoring system for use with cigarette selling machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of monitoring a plurality of automatic selling machines each having a plurality of sensors, each sensor delivering a signal in response to a predetermined operational condition and/or interference in the machine, comprising the steps of converting the signal from each sensor into a code signal assigned to a corresponding operational condition and/or interference, combining the coded signal with a recognition code pertaining to a particular selling machine, transmitting the combined signal via a telephone network to a central switching station where the recognition code is interpreted and the remaining signal switched over to a subscriber line and transmitted to a subscriber station where the signal is decoded and the message is displayed on a display board and/or recorded in a recording device.

2. A device for monitoring a plurality of automatic selling machines each having a plurality of sensors for delivering in response to a predetermined operational condition and/or interference in the machine an output signal, comprising a coding device for converting respective output signals from the sensors into corresponding codes, said sensors being connected to a power source, said power source being a low voltage source from a telephone network, a part of said plurality of sensors being directly connected to the coding device via conductors and the remaining sensors being connected to the coding device by different combinations of said conductors, said coding device generating composite coded signals by combining the coded output signals with a recognition code pertaining to particular selling machines and to a particular subscriber station, said coding device further converting the composite coded signals into different frequencies, a central switching station connected via telephone network to the coding device of each of said selling machines to receive said different frequencies, said central switching station decoding the recognition code pertaining to a subscriber station and switching over the coded output signal to a corresponding subscriber line, and a subscriber station connected to a subscriber line and including a computer for decoding the received output signals and processing the received message and displaying the message on a display and/or recording means.

3. A device as defined in claim 2 wherein said sensors are in the form of switches connected between said power source and said conductors.

* * * * *